United States Patent [19]

Lin

[11] Patent Number: 5,507,215

[45] Date of Patent: Apr. 16, 1996

[54] KEYBOARD ASSEMBLY

[75] Inventor: Chun-Kuan Lin, Nan-Tou, Taiwan

[73] Assignee: Mei-Chih Tsai, Taipei Hsien, Taiwan

[21] Appl. No.: 361,052

[22] Filed: Dec. 21, 1994

[51] Int. Cl.[6] ............................ G10C 3/12; G10D 15/00; B41J 3/54; B41J 5/08

[52] U.S. Cl. .................. 84/423 R; 84/DIG. 17; 84/170; 400/82; 400/472; D17/2

[58] Field of Search ..................... 84/423 R, 170, 84/171, 644, 670, 718, 743, DIG. 17; 400/472, 485, 496, 489, 82; 341/22, 23; 235/145 R, 146; D17/1, 2, 6

[56] References Cited

U.S. PATENT DOCUMENTS

| | | | |
|---|---|---|---|
| D. 358,808 | 5/1995 | Murdoch et al. | D17/2 |
| 2,784,633 | 3/1957 | Hess | 84/423 R |
| 5,160,919 | 11/1992 | Mohler et al. | 400/82 |

*Primary Examiner*—Cassandra C. Spyrou
*Attorney, Agent, or Firm*—Arnold, White & Durkee

[57] ABSTRACT

A keyboard assembly is to be connected to a keyboard port of a host computer and includes a keyboard housing having opposite first and second horizontal faces and opposite vertical side walls at opposite longitudinal ends of the horizontal faces. An array of organ keys is disposed resiliently on the first horizontal face. An organ circuit array is disposed in the keyboard housing and is associated operably with the organ keys. An array of computer keys is disposed resiliently on the second horizontal face. A computer circuit array is disposed in the keyboard housing and is associated operably with the computer keys. A pair of upright support panels is mounted respectively on the side walls of the keyboard housing. Each of the support panels has two opposed distal ends which project respectively past the organ keys and the computer keys. A processor unit is connected electrically to the organ circuit array and the computer circuit array and is to be connected to the keyboard port of the host computer.

13 Claims, 12 Drawing Sheets

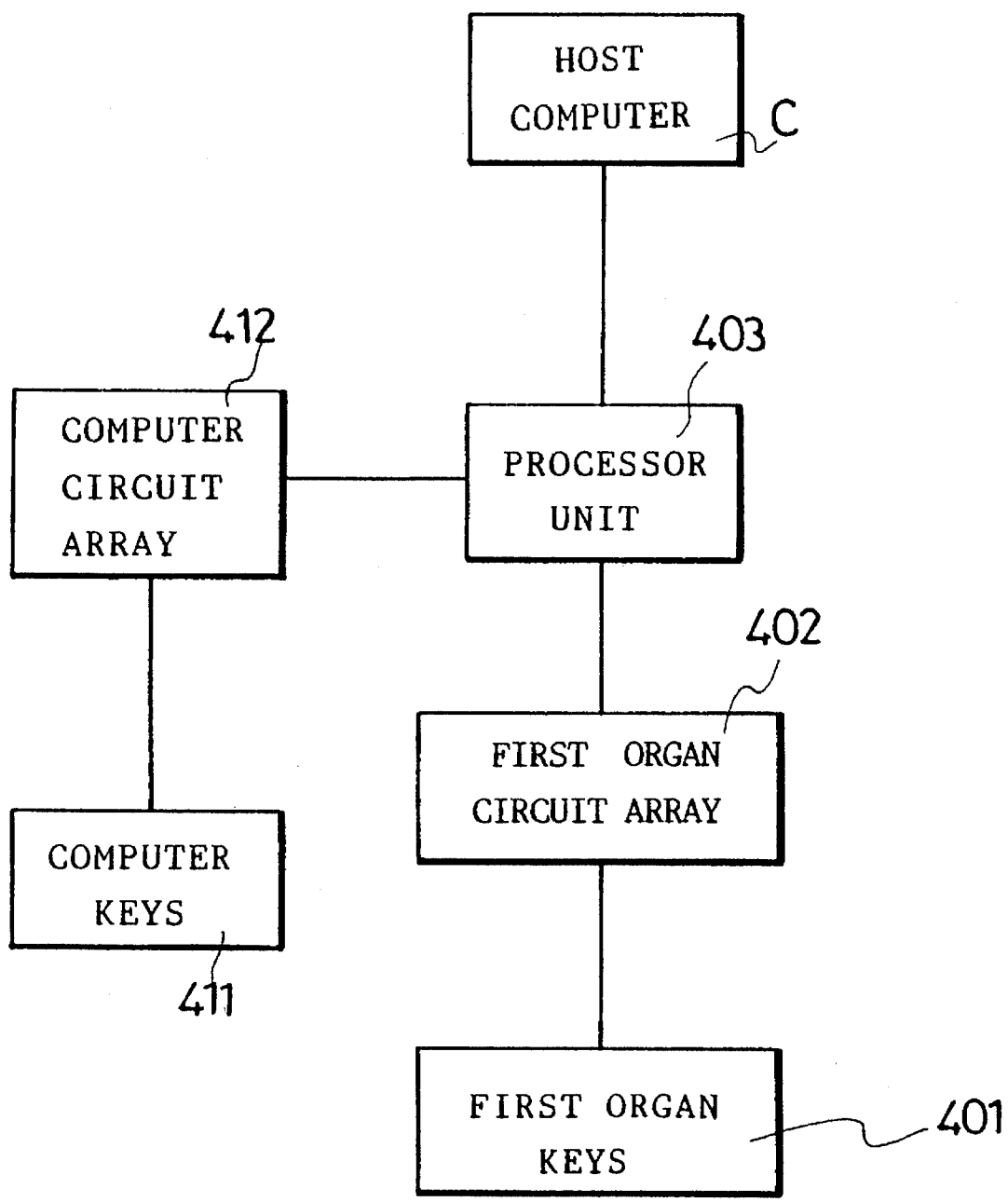
F I G. 5

5,507,215

KEYBOARD ASSEMBLY

BACKGROUND OF THE INVENTION

1. Field of the Invention

This invention relates to a keyboard assembly, more particularly to a keyboard assembly which incorporates computer and organ keys.

2. Description of the Related Art

Referring to FIG. 1, a conventional computer system 1 usually includes a display unit 10, a host computer 11 which is connected electrically to the display unit 10, and a computer keyboard 12 which is connected electrically to the host computer 11 through a keyboard port. Due to the growing popularity of multimedia applications, an organ keyboard 3 is connected electrically to the host computer 11 via an audio interface device (not shown), such as a sound blast card, so that the conventional computer system 1, when installed with appropriate music software, can be operated as a musical instrument by operating the organ keyboard 3. Since the operating space in front of the user is relatively small, the organ keyboard 3 has to be moved in order to place the computer keyboard 12 in front of the user when there is a need to operate the computer keyboard 12. Thus, it is inconvenient for the user to move the organ keyboard 3 and the computer keyboard 12 back and forth. Furthermore, the number of keys provided on the organ keyboard 3 is usually insufficient for the user to perform the main melody and the chords of a complete song.

SUMMARY OF THE INVENTION

Therefore, the main objective of the present invention is to provide a keyboard assembly which incorporates computer and organ keys.

According to the present invention, a keyboard assembly is to be connected to a keyboard port of a host computer and includes a first keyboard housing having opposite first and second horizontal faces and opposite vertical side walls at opposite longitudinal ends of the horizontal faces. An array of organ keys is disposed resiliently on the first horizontal face. An organ circuit array is disposed in the keyboard housing and is associated operably with the organ keys. An array of computer keys is disposed resiliently on the second horizontal face. A computer circuit array is disposed in the keyboard housing and is associated operably with the computer keys. A pair of upright support panels are mounted respectively on the side walls of the keyboard housing. Each of the support panels has two opposed distal ends which project respectively past the organ keys and the computer keys. A processor unit is connected electrically to the organ circuit array and the computer circuit array and is to be connected to the keyboard port of the host computer.

BRIEF DESCRIPTION OF THE DRAWINGS

Other features and advantages of the present invention will become apparent in the following detailed description of the preferred embodiments, with reference to the accompanying drawings, of which:

FIG. 5 is a schematic block diagram illustrating how a computer circuit array and an organ circuit array are connected electrically to a host computer in accordance with the first embodiment of the present invention;

DETAILED DESCRIPTION OF THE PREFERRED EMBODIMENT

Figure 1:
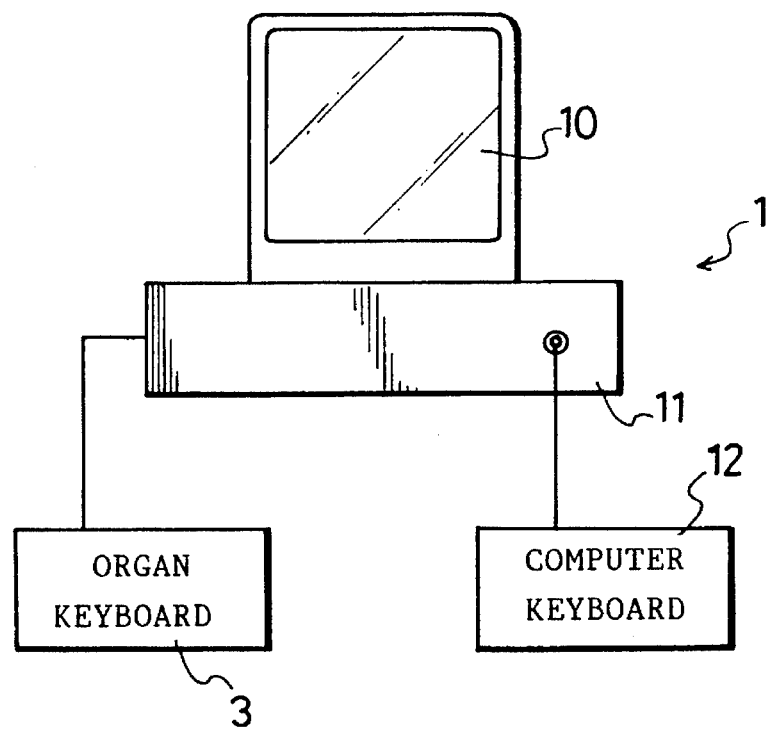
FIG. 1 is a schematic view illustrating a conventional computer system which includes a host computer and an organ keyboard connected to the host computer.
Figure 2:
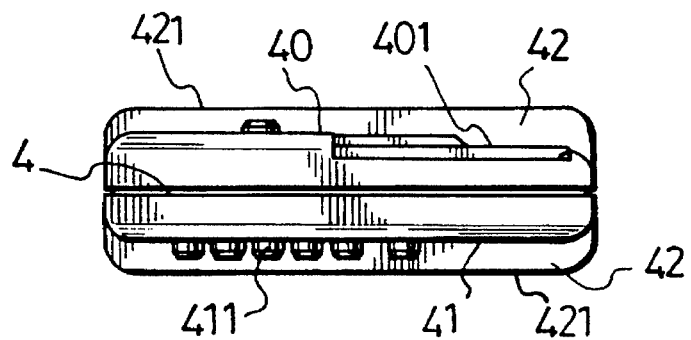
FIG. 2 is a schematic side view illustrating a keyboard assembly according to a first embodiment of the present invention, one of the support panels being absent from the drawing.
Figure 3:
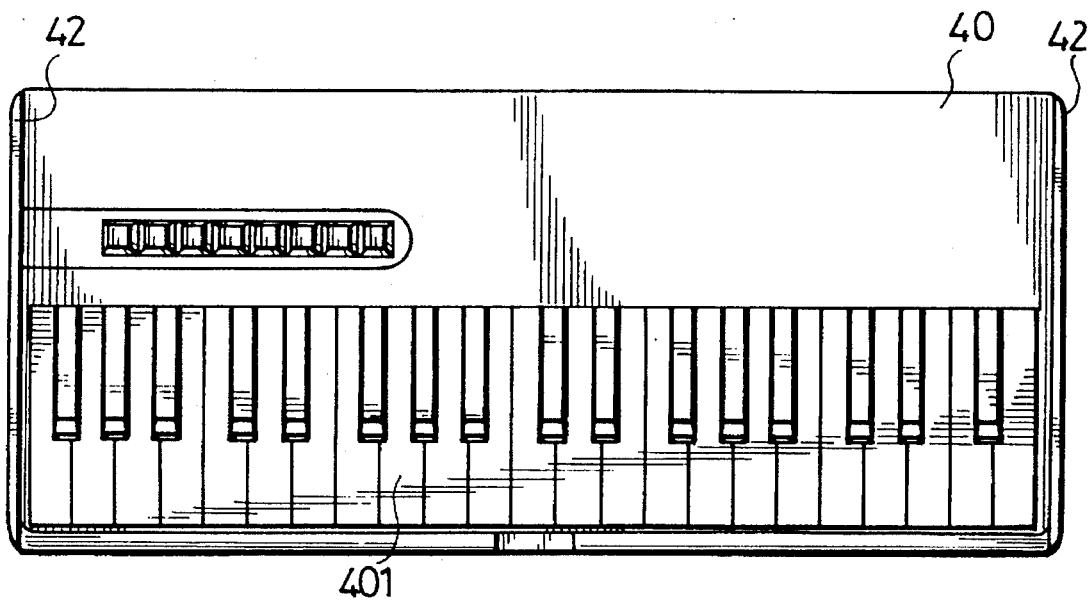
FIG. 3 is a schematic view showing an array of organ keys of the keyboard assembly shown in FIG. 2.
Figure 4:
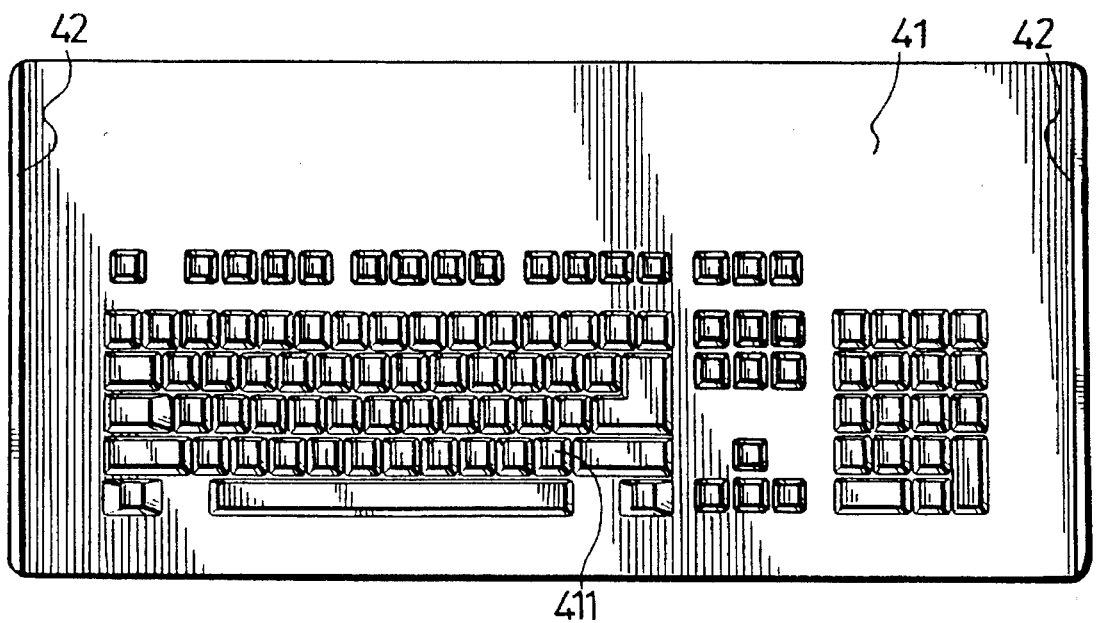
FIG. 4 is a schematic view showing an array of computer keys of the keyboard assembly shown in FIG. 2.

Referring to FIGS. 2, 3 and 4, a keyboard assembly according to the first embodiment of the present invention includes a first keyboard housing 4 which has opposite first and second horizontal faces 40 and 41 and opposite vertical side walls at opposite longitudinal ends of the horizontal faces 40,41.

An array of first organ keys 401 is disposed resiliently on the first horizontal face 40 of the first keyboard housing 4.

A first organ circuit array 402 (FIG. 5) is disposed in the first keyboard housing 4 and is associated operably with the first organ keys 401.

An array of computer keys 411 is disposed resiliently on the second horizontal face 41 of the first keyboard housing 4.

A computer circuit array 412 (FIG. 5) is disposed in the first keyboard housing 4 and is associated operably with the computer keys 411.

A pair of upright support panels 42 are mounted respectively on the side walls of the first keyboard housing 4. Each of the support panels 42 has two opposed distal ends 421 which project respectively past the first organ keys 401 and the computer keys 411 so that neither the first organ keys 401 nor the computer keys 411 will contact a support surface (not shown) when the keyboard assembly is placed on the support surface.

As best shown in FIG. 5, a processor unit 403 is connected electrically to the first organ circuit array 402 and the computer circuit array 412 and is connected to a keyboard port of a host computer (C). Thus, the first organ keys 401 and the computer keys 411 can be operated selectively by simply inverting the first keyboard housing 4.

Figure 6:
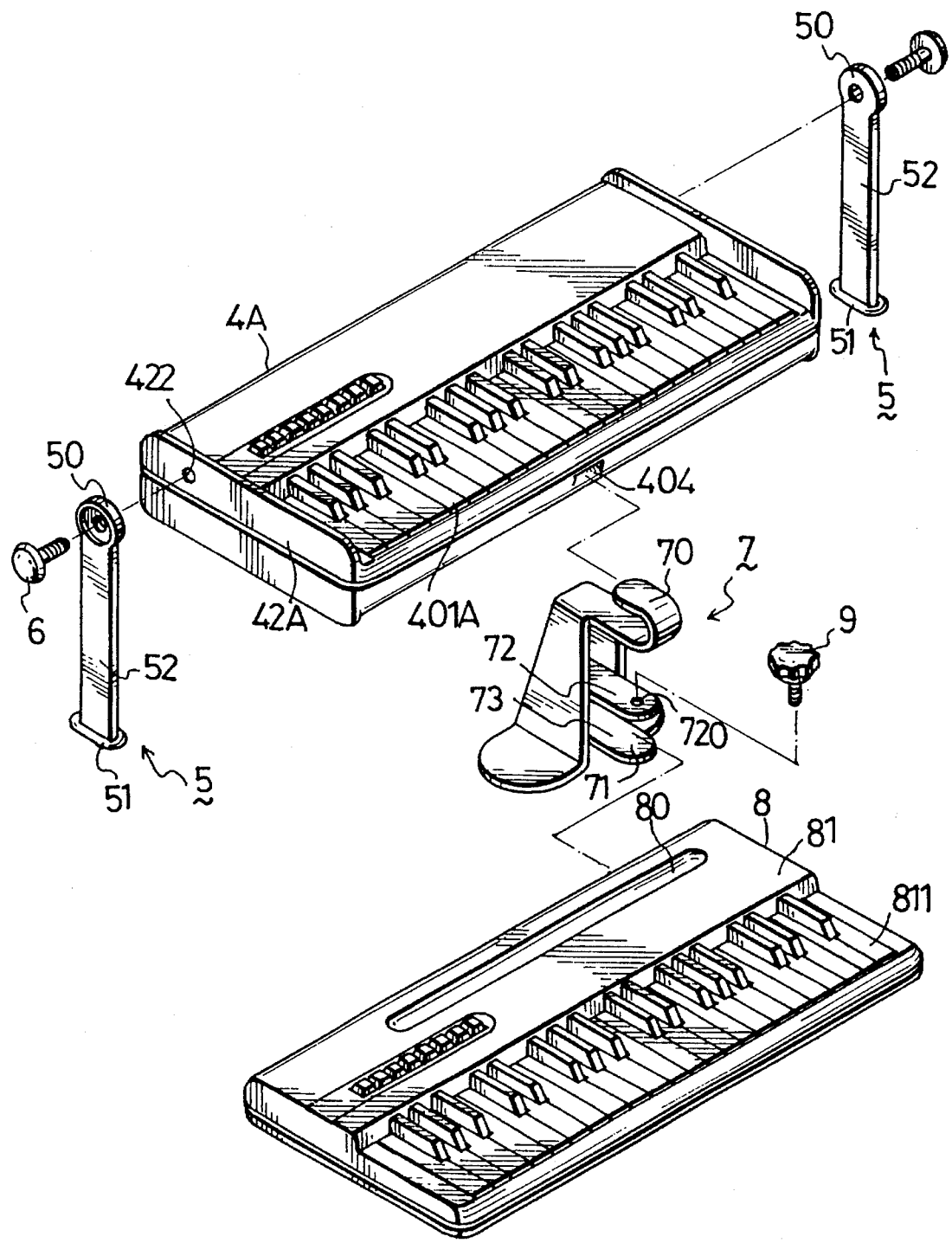
FIG. 6 is a partly exploded view illustrating a keyboard assembly according to a second embodiment of the present invention.
Figure 7:
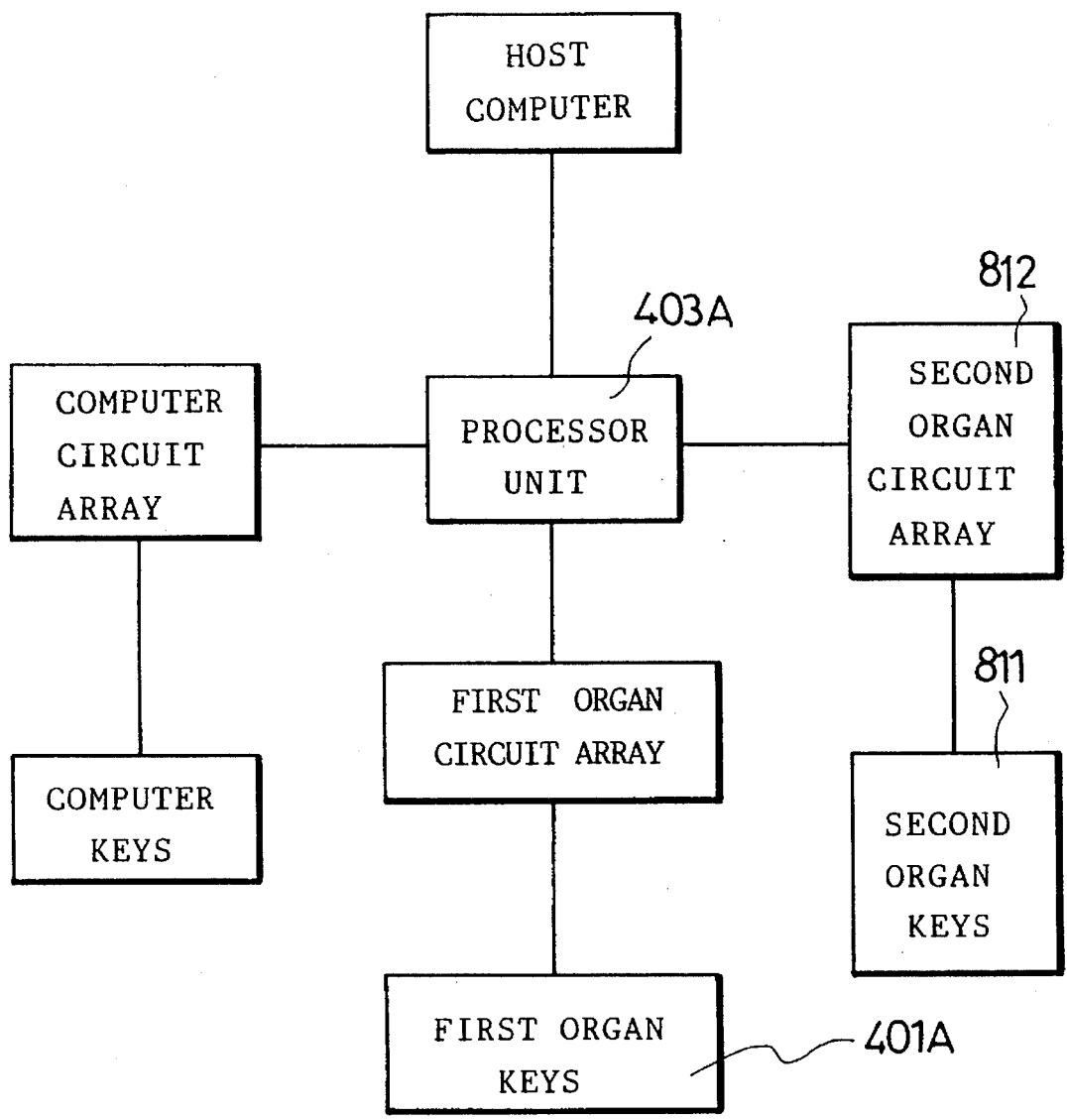
FIG. 7 is a schematic block diagram illustrating how a computer circuit array, a first organ circuit array and a second organ circuit array are connected electrically to a host computer in accordance with the second embodiment of the present invention.
Figure 8:
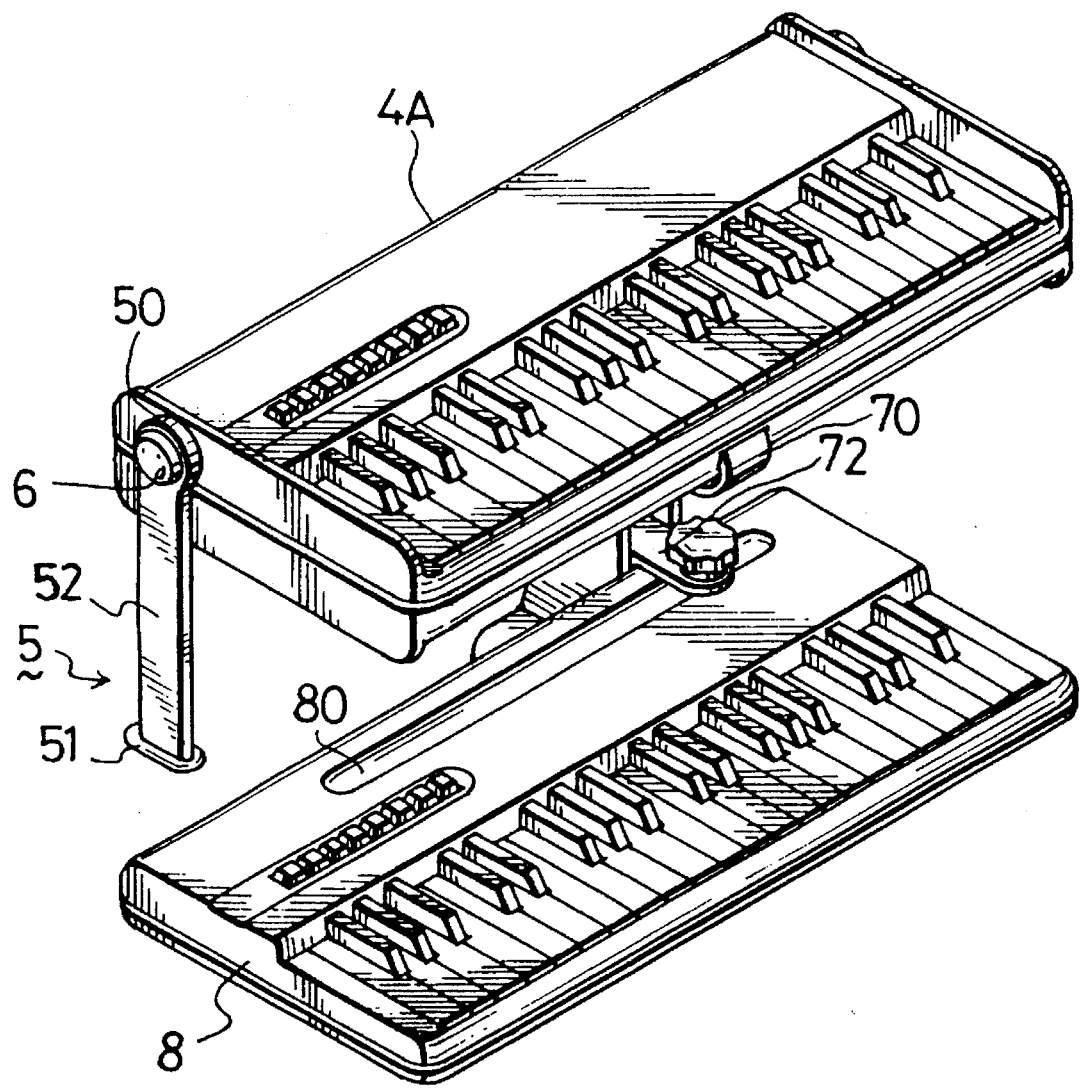
FIG. 8 is a schematic view showing an assembled keyboard assembly according to the second embodiment of the present invention.

Referring to FIGS. 6, 7 and 8, a second embodiment of the present invention is shown. A first keyboard housing (4A) has a front edge portion which has a vertical front wall that interconnects the vertical side walls and that is formed with an engaging groove 404. Each of the support panels (42A) is formed with a locking hole 422. The keyboard assembly further includes a leg unit 5. In the present embodiment, the leg unit 5 includes two leg members 52. Each of the leg members 52 has an end portion 50 which is connected pivotally to a respective one of the support panels (42A) by the extension of a locking bolt 6 through the support panel (42A) and into the first keyboard housing (4A) so that a free end portion 51 of the leg member 52 is rotatable relative to the first keyboard housing (4A). The first keyboard housing (4A) is spaced apart from a support surface when the free end portions 51 of the leg members 52 stand on the support surface.

A second keyboard housing 8 has a horizontal face 81 and a rear edge portion. The horizontal face 81 of the second keyboard housing 8 is formed with a longitudinally extending guide groove 80 adjacent to the rear edge portion of the second keyboard housing 8.

An array of second organ keys 811 is disposed resiliently on the horizontal face 81 of the second keyboard housing 8.

A second organ circuit array 812 (FIG. 7) is disposed in the second keyboard housing 8 and is associated operably with the second organ keys 811. The second organ circuit array 812 is connectable electrically to the processor unit (403A).

A coupling member 7 has an upper connecting portion and a lower connecting portion. The upper connecting portion of the coupling member 7 has an insert section 70 which extends removably into the engaging groove 404 of the first keyboard housing (4A). The lower connecting portion of the coupling member 7 has spaced upper and lower clamping plates 72 and 71 which cooperatively define a receiving space 73 therebetween. The receiving space 73 receives the rear edge portion of the second keyboard housing 8 therein. A locking bolt 9 extends into the guide groove 80 of the second keyboard housing 8 through a through-hole 720 in the upper clamping plate 72 so as to prevent movement of the second keyboard housing 8 relative to the coupling member 7.

Figure 9:
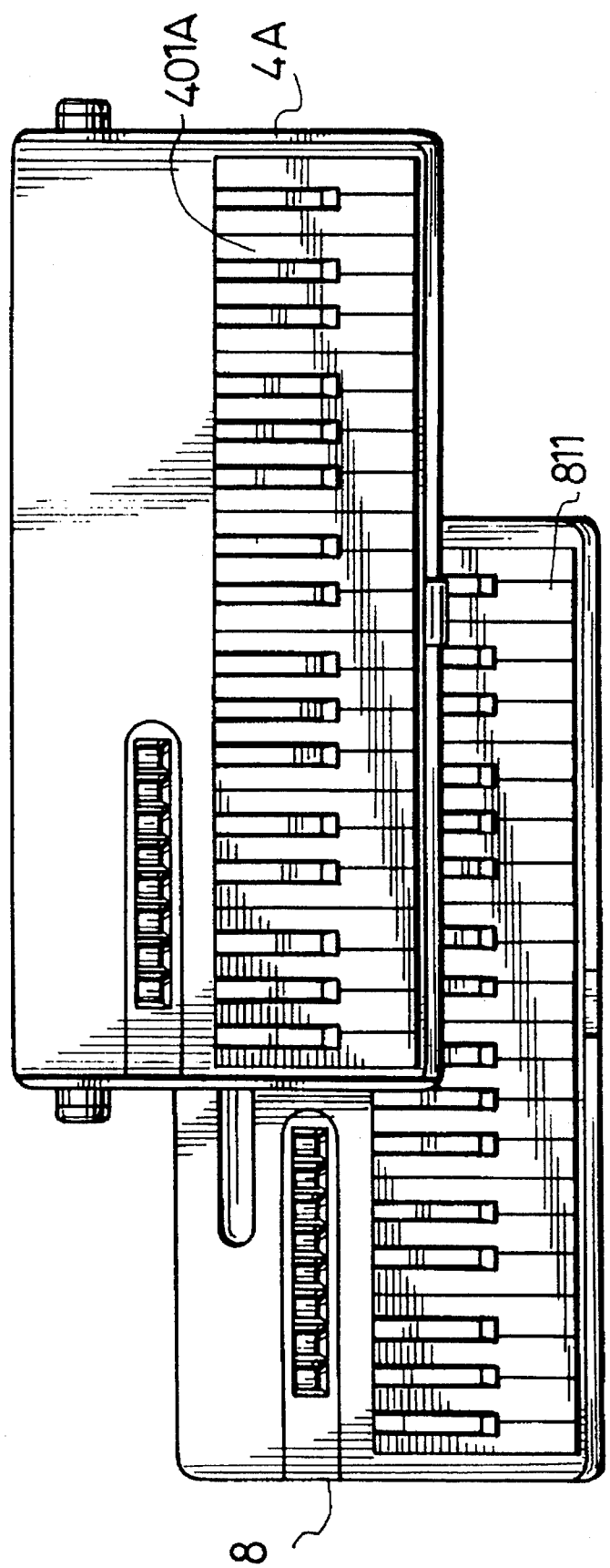
FIG. 9 is a top view of FIG. 8.

As best shown in FIG. 9, since the second keyboard housing 8 has a front edge portion which is not covered by the first keyboard housing (4A), it is convenient to operate the first and second organ keys, (401A) and 811. Furthermore, the second keyboard housing 8 is movable relative to the first keyboard housing (4A) when the locking bolt 9 (FIG. 6) is released so as to permit positioning of the second keyboard housing 8 in order for the user to operate the first and second organ keys, (401A) and 811, comfortably.

Figure 10:
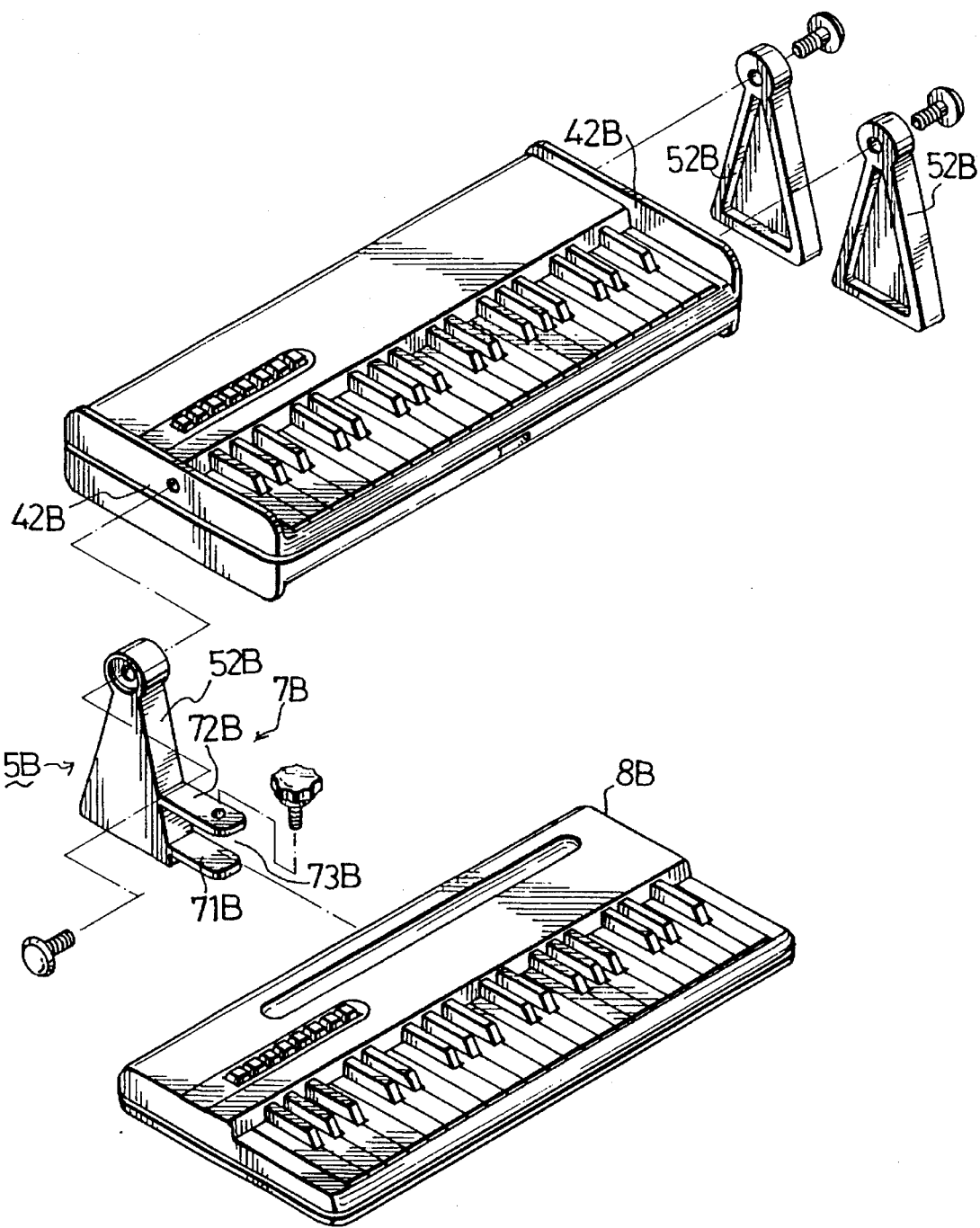
FIG. 10 is a partly exploded view illustrating a keyboard assembly according to a third embodiment of the present invention.

Referring to FIG. 10, a third embodiment of the present invention is shown. In the present embodiment, the leg unit (5B) includes three leg members (52B). One of the leg members (52B) is connected pivotally to one of the support panels (42B), while the other ones of the leg members (52B) are connected pivotally to the other one of the support panels (42B). The connections among the leg members (52B) and the support panels (42B) are similar to those of the leg members 52 of the second embodiment and will not be described further. In the present embodiment, the coupling member (7B) is connected to one of the leg members (52B). The coupling member (7B)i includes spaced upper and lower clamping plates (72B,71B) which cooperatively define a receiving space (73B) therebetween. The rear edge portion of the second keyboard housing (SB) is received in the receiving space (73B) in a manner similar to that of the second embodiment.

Figure 11:
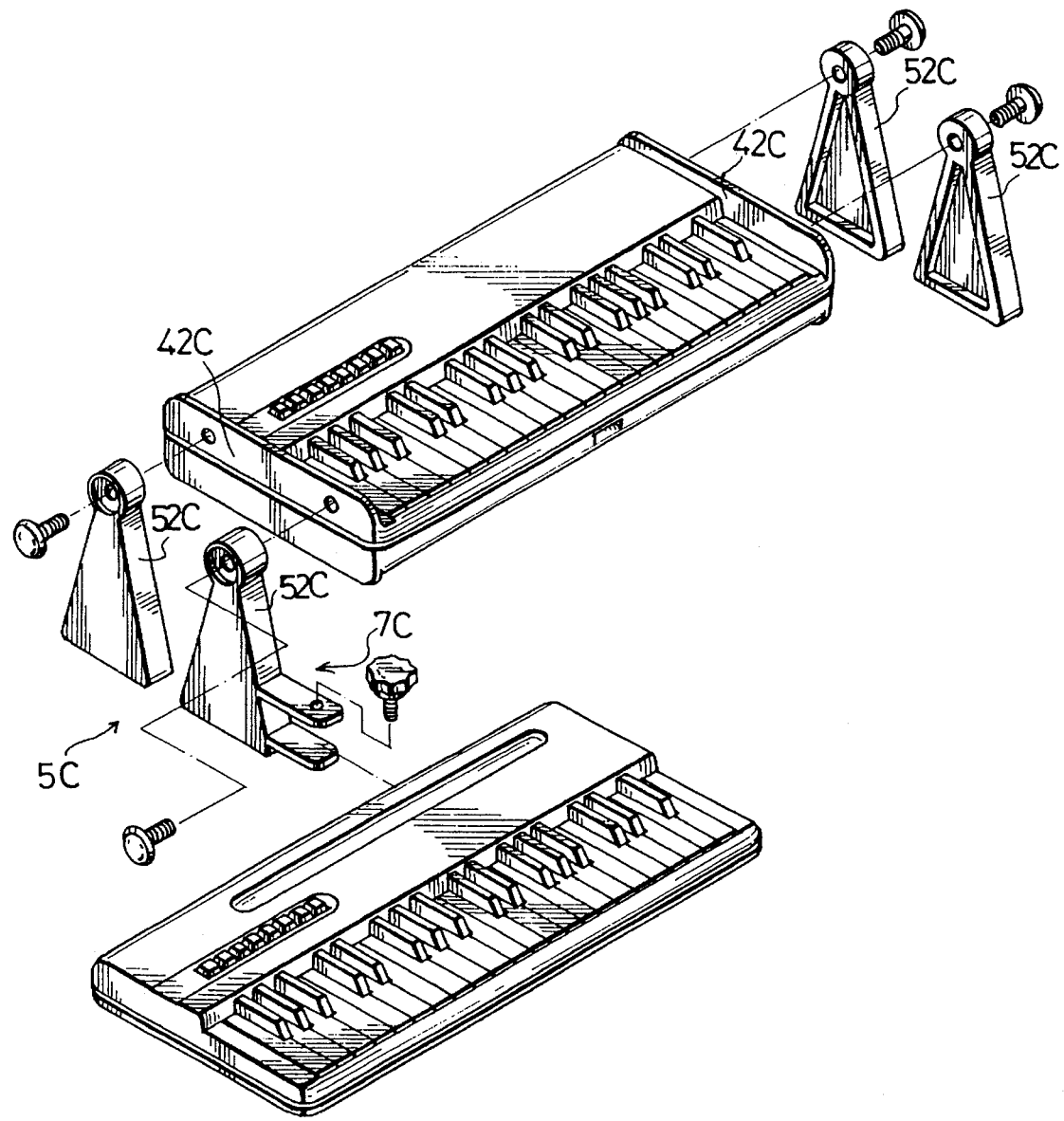
FIG. 11 is a partly exploded view illustrating a keyboard assembly according to a fourth embodiment of the present invention.

Referring to FIG. 11, a fourth embodiment of the present invention is shown. Unlike the third embodiment, the leg unit (5C) includes four leg members (52C). Each support panel (42C) has two leg members (52C) connected thereto. The coupling member (7C) is connected to one of the leg members (52C) which is located adjacent to the front edge portion of the first keyboard housing (4C).

Figure 12:
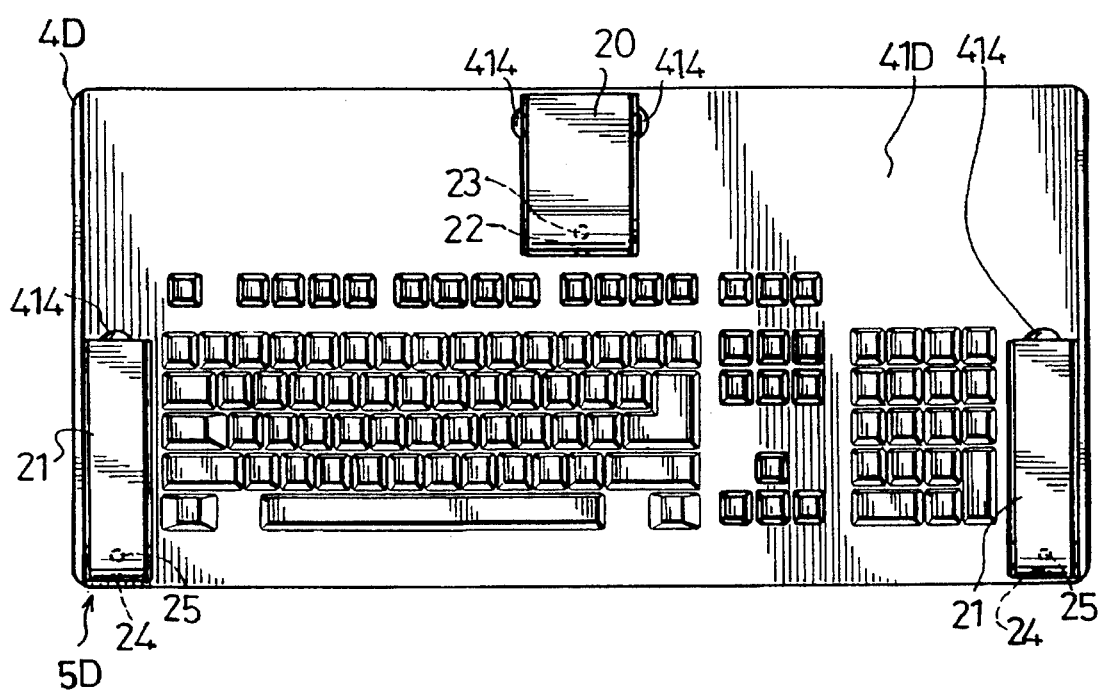
FIG. 12 is a schematic view showing a keyboard assembly according to a fifth embodiment of the present invention.
Figure 13:
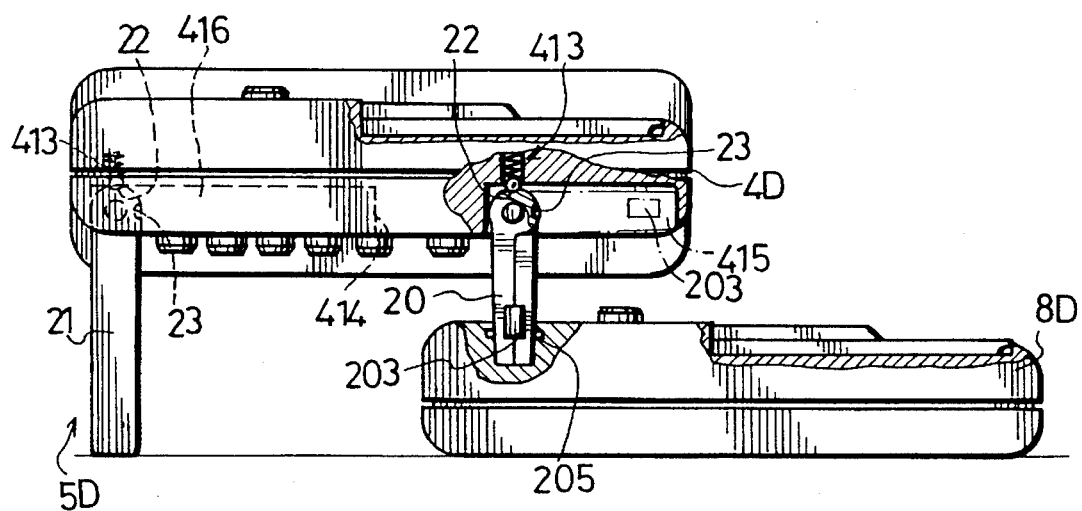
FIG. 13 is a side view showing the keyboard-assembly according to the fifth embodiment of the present invention.
Figure 14:
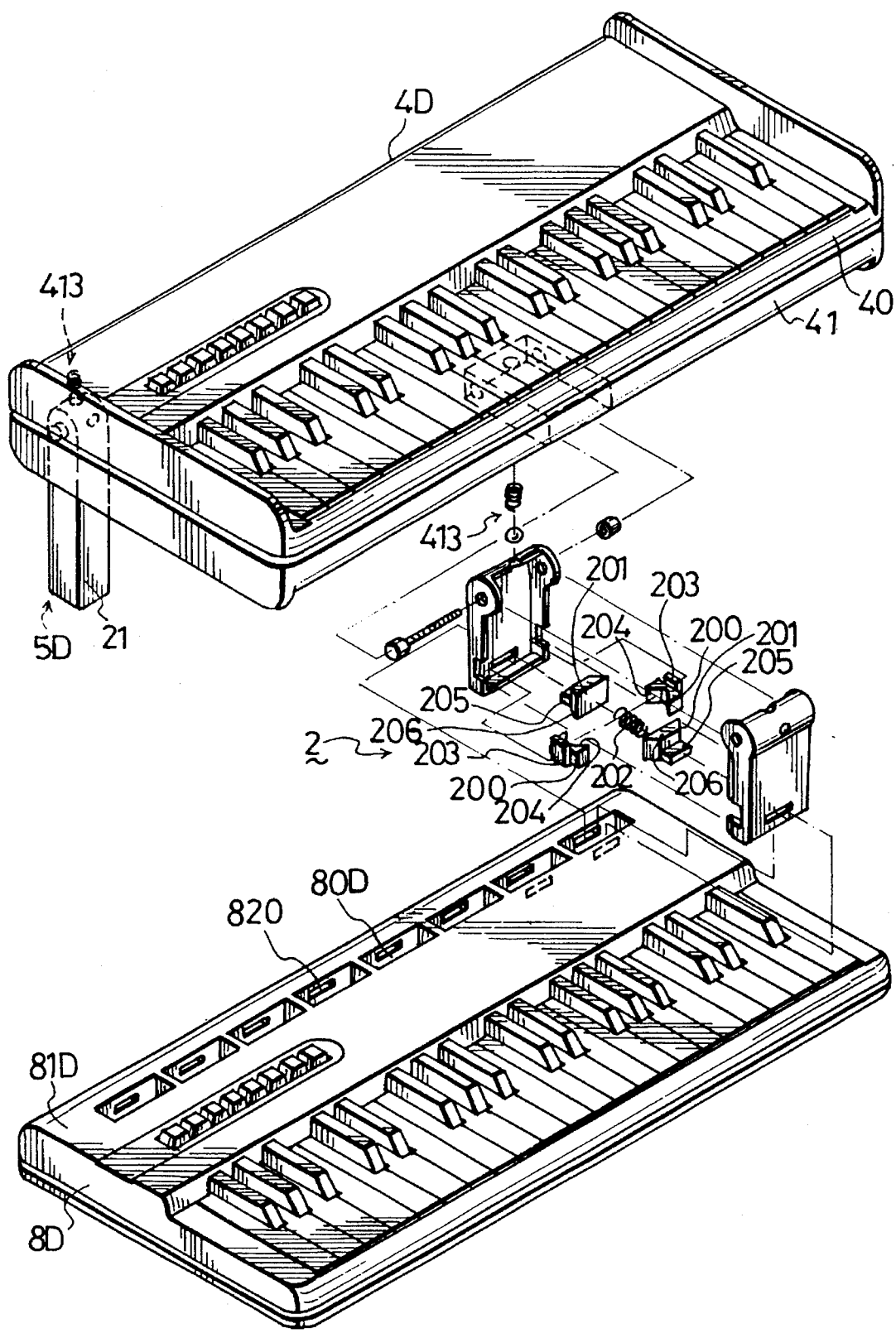
FIG. 14 is a perspective, partly exploded view illustrating the keyboard assembly according to the fifth embodiment of the present invention.

Referring to FIGS. 12, 13 and 14, a fifth embodiment of the present invention is shown. In the present embodiment, the second horizontal face (41D) of the first keyboard housing (4D) is formed with a first receiving groove 415 (FIG. 13) adjacent to the front edge portion thereof and two second receiving grooves 416 (FIG. 13) adjacent to the rear edge portion thereof. The second keyboard housing (SD) (FIGS. 13 and 14) has a horizontal face (81D) (FIG. 14) formed with a plurality of insert grooves (80D) which are located adjacent to a rear edge portion thereof and which are aligned longitudinally. Each of the insert grooves (80D) has two vertical confining walls which are opposite to each other and which are formed with aligned retaining slots 820 (only one is shown in FIG. 14).

The coupling member 2 includes a hollow casing 20, two spring-loaded protrusions 201 and two releasing members 200. The casing 20 of the coupling member 2 is received in the first receiving groove 415 and has one end portion connected pivotally to the first keyboard housing (4D) and a distal end portion. The casing 20 of the coupling member 2 is foldable between a first position, wherein the casing 20 of the coupling member 2 is parallel to the second horizontal face (41D) of the first keyboard housing (4D), and a second position, wherein the casing 20 of the coupling member 2 is transverse to the second horizontal face (41D) of the first keyboard housing (4D). The distal end portion of the casing 20 of the coupling member 2 is insertable into a selected one of the insert grooves (80D) of the second keyboard housing (8D) when the coupling member 2 is in the second position. Each of the spring-loaded protrusions 201 is disposed in the casing 20 adjacent to the distal end of the latter and is opposite to the other. Each of the protrusions 201 includes an insert section 205. A spring 202 is interposed between the protrusions 201 so as to normally bias the insert sections 205 of the protrusions 201 to extend out of the casing 20 and into the corresponding retaining slots 820 when the distal end of the coupling member 2 is inserted into the insert groove (80D). Each of the protrusions 201 further includes a converging section 206 which is defined by two inclined side surfaces that converge at the junction of the insert and converging sections, 205 and 206. The releasing members 200 are disposed in the casing 20 and are associated operatively with the protrusions 201. Each releasing member 200 has a push head 203 which extends out of the casing 20 and is formed with a notch 204 which opens toward the converging sections 206 of the protrusions 201 and which has two notch confining walls that complement the corresponding inclined side surfaces of the converging sections 206 such that, when the push heads 203 of the releasing members 200 are pressed, the releasing members 200 move toward each other in order to cause the protrusions 201 to move toward each other, thereby resulting in retraction of the insert sections 205 of the protrusions 201 from the retaining slots 820 into the casing 20 so as to permit disengagement of the coupling member 2 from the insert groove (80D). The casing 20 of the coupling member 2 has a periphery which is provided with first and second recesses, 22 and 23. The first receiving groove 415 has a groove confining wall which is provided with a spring-loaded tumbler means 413 that is capable of engaging the first and second recesses, 22 and 23, of the coupling member 2 so as to retain releasably the coupling member 2 in the first and second position.

The leg unit (5D) includes two leg members 21. Each of the leg members 21 has an end portion connected pivotally to the first keyboard housing and is movable between a folded position, wherein the leg members 21 of the leg unit (5D) are parallel to the second horizontal face (41D) of the first keyboard housing (4D), and an unfolded position, wherein the leg members 21 of the leg unit (5D) are transverse to the second horizontal face (41D) of the first keyboard housing (4D). Each of the leg members 21 has a periphery provided with first and second recesses, 24 and 25, and is received in the corresponding second receiving groove 416 when the leg member 21 is in the folded position. Each of the second receiving grooves 416 has a groove confining wall provided with a spring-loaded tumbler means 413 which is capable of engaging the first and second recesses, 24 and 25, of the corresponding leg member 21 so as to retain releasably the leg unit (5D) in the folded and unfolded positions.

It should be noted that the second horizontal face (41D) of the first keyboard housing (4D) is further formed with a plurality of indented sections 414. Each of the indented sections 414 is located adjacent to a respective one of the first and second receiving grooves 415 and 416. The indented sections 414 facilitate moving of the coupling member 2 from the first position to the second position and moving of the leg members 21 from the folded position to the unfolded position.

Accordingly, the keyboard assembly according to the present invention has the following advantages:

1. Since the first keyboard housing of the keyboard assembly of the present invention includes first and second horizontal faces on which first organ keys and computer keys are disposed resiliently and respectively, the first organ keys and the computer keys can be operated selectively by simply inverting the first keyboard housing.
2. The first organ keys may be great organ keys, while the second organ keys may be choir organ keys, thereby permitting the user to perform a complete song.
3. Since the first keyboard housing and the second keyboard housing can be vertically spaced apart by an appropriate distance, the first organ keys and the second organ keys can be operated conveniently.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A keyboard assembly to be connected to a keyboard port of a host computer, said keyboard assembly comprising:

a first keyboard housing having opposite first and second horizontal faces and opposite vertical side walls at opposite longitudinal ends of said horizontal faces;

an array of first organ keys disposed resiliently on said first horizontal face;

a first organ circuit array disposed in said first keyboard housing and associated operably with said first organ keys;

an array of computer keys disposed resiliently on said second horizontal face;

a computer circuit array disposed in said first keyboard housing and associated operably with said computer keys;

a pair of upright support panels mounted respectively on said side walls of said first keyboard housing, each of said support panels having two opposed distal ends which project respectively past said first organ keys and said computer keys; and a processor unit connected electrically to said first organ circuit array and said computer circuit array and to be connected to said keyboard port of said host computer.

2. A keyboard assembly as claimed in claim 1, wherein said first keyboard housing further has a front edge portion, said keyboard assembly further comprising:

a leg unit connected to at least one of said support panels;

a second keyboard housing having a horizontal face and a rear edge portion;

an array of second organ keys disposed resiliently on said horizontal face of said second keyboard housing;

a second organ circuit array disposed in said second keyboard housing and associated operably with said second organ keys, said second organ circuit array being connectable electrically to said processor unit; and a coupling member having an upper connecting portion connected releasably to said front edge portion of said first keyboard housing and a lower connecting portion connected releasably to said rear edge portion of said second keyboard housing.

3. A keyboard assembly as claimed in claim 2, wherein said leg unit includes at least two leg members, each of said leg members having an end portion which is connected pivotally to a respective one of said support panels.

4. A keyboard assembly as claimed in claim 2, wherein said front edge portion of said first keyboard housing has a vertical front wall which interconnects said vertical side walls and which is formed with an engaging groove, said upper connecting portion of said coupling member having an insert section which extends removably into said engaging groove.

5. A keyboard assembly as claimed in claim 2, wherein said horizontal face of said second keyboard housing is formed with a longitudinally extending guide groove adjacent to said rear edge portion of said second keyboard housing, said lower connecting portion of said coupling member having spaced upper and lower clamping plates which cooperatively define a receiving space therebetween, said receiving space receiving said rear edge portion of said second keyboard housing therein, said coupling member further including a locking bolt extending into said guide groove through said upper clamping plate.

6. A keyboard assembly as claimed in claim 1, further comprising:

a leg unit connected to at least one of said support panels;

a second keyboard housing having a horizontal face and a rear edge portion;

an array of second organ keys disposed resiliently on said horizontal face of said second keyboard housing;

a second organ circuit array disposed in said second keyboard housing and associated operably with said second organ keys, said second organ circuit array being connectable electrically to said processor unit; and a coupling member connected to said leg unit, said coupling member being connected releasably to said rear edge portion of said second keyboard housing.

7. A keyboard assembly as claimed in claim 6, wherein said leg unit includes at least two leg members, each of said leg members having an end portion which is connected pivotally to a respective one of said support panels, said coupling member being connected to one of said leg members.

8. A keyboard assembly as claimed in claim 6, wherein said horizontal face of said second keyboard housing is formed with a longitudinally extending guide groove adjacent to said rear edge portion of said second keyboard housing, said coupling member having spaced upper and lower clamping plates which cooperatively define a receiving space therebetween, said receiving space receiving said rear edge portion of said second keyboard housing therein, said coupling member further including a locking bolt extending into said guide groove through said upper clamping plate.

9. A keyboard assembly as claimed in claim 1, wherein said first keyboard housing further has a front edge portion, said keyboard assembly further comprising:

a second keyboard housing having a horizontal face and a rear edge portion, said second keyboard housing being formed with at least one insert groove adjacent to said rear edge portion of said second keyboard housing;

an array of second organ keys disposed resiliently on said horizontal face of said second keyboard housing;

a second organ circuit array disposed in said second keyboard housing and associated operably with said second organ keys, said second organ circuit array being connectable electrically to said processor unit;

a coupling member connected pivotally to said first keyboard housing adjacent to said front edge portion of said first keyboard housing and foldable between a first position, wherein said coupling member is parallel to said second horizontal face of said first keyboard housing, and a second position, wherein said coupling member is transverse to said second horizontal face of said first keyboard housing, said coupling member having a distal end portion insertable into said insert groove when said coupling member is in said second position; and a leg unit connected pivotally to said first keyboard housing and movable between a folded position, wherein said leg unit is parallel to said second horizontal face of said first keyboard housing, and an unfolded position, wherein said leg unit is transverse to said second horizontal face of said first keyboard housing.

10. A keyboard assembly as claimed in claim 9, wherein said coupling member has a periphery provided with first and second recesses, said second horizontal face of said first keyboard housing being formed with a first receiving groove in which said coupling member is received when said coupling member is in said first position, said first receiving groove having a groove confining wall provided with a spring-loaded tumbler means capable of engaging said first and second recesses of said coupling member so as to retain releasably said coupling member in said first and second positions.

11. A keyboard assembly as claimed in claim 9, wherein said leg unit has a periphery provided with first and second recesses, said second horizontal face of said first keyboard housing being formed with a second receiving groove in which said leg unit is received when said leg unit is in said folded position, said second receiving groove having a groove confining wall provided with a spring-loaded tumbler means capable of engaging said first and second recesses of said leg unit so as to retain releasably said leg unit in said folded and unfolded positions.

12. A keyboard assembly as claimed in claim 9, wherein said insert groove has a vertical confining wall formed with a retaining slot, said coupling member including a hollow casing, a spring-loaded protrusion disposed in said casing and normally biased to extend out of said casing and into said retaining slot when said coupling member is inserted into said insert groove, and a releasing member disposed in said casing and associated operatively with said protrusion, said releasing member having a push head which extends out of said casing and which is operable to retract said protrusion from said retaining slot into said casing so as to permit disengagement of said coupling member from said insert groove.

13. A keyboard assembly as claimed in claim 9, wherein said second keyboard housing is formed with a plurality of said insert grooves which are aligned longitudinally.

* * * * *